(12) United States Patent
Stiller

(10) Patent No.: US 12,031,243 B2
(45) Date of Patent: Jul. 9, 2024

(54) METHODS TO PRODUCE CARBON FIBERS FROM CARBON PITCHES

(71) Applicant: West Virginia University, Morgantown, WV (US)

(72) Inventor: Alfred H. Stiller, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 464 days.

(21) Appl. No.: 17/119,997

(22) Filed: Dec. 11, 2020

(65) Prior Publication Data

US 2021/0180217 A1    Jun. 17, 2021

Related U.S. Application Data

(60) Provisional application No. 62/946,643, filed on Dec. 11, 2019.

(51) Int. Cl.
| | | |
|---|---|---|
| *D01F 9/15* | (2006.01) | |
| *C01B 32/05* | (2017.01) | |
| *D01F 8/18* | (2006.01) | |
| *D01F 9/155* | (2006.01) | |

(52) U.S. Cl.
CPC ............... *D01F 9/15* (2013.01); *C01B 32/05* (2017.08); *D01F 8/18* (2013.01); *D01F 9/155* (2013.01)

(58) Field of Classification Search
CPC ..................................... D01F 9/14; D01F 9/15
See application file for complete search history.

(56) References Cited

U.S. PATENT DOCUMENTS

| | | | | |
|---|---|---|---|---|
| 4,276,278 A | * | 6/1981 | Barr | D01F 9/145 423/447.5 |
| 10,941,042 B2 | | 3/2021 | Stiller | |
| 2008/0017549 A1 | * | 1/2008 | Kennel | C10G 69/02 208/41 |
| 2012/0082593 A1 | * | 4/2012 | Stiller | C10G 1/065 422/187 |
| 2017/0073846 A1 | * | 3/2017 | Decker | D01F 9/32 |
| 2018/0051399 A1 | * | 2/2018 | Suzuki | D06M 15/51 |

FOREIGN PATENT DOCUMENTS

| | | | | | |
|---|---|---|---|---|---|
| CN | 103015158 A | * | 4/2013 | | |
| JP | 2000045134 A | * | 2/2000 | | D01F 9/145 |
| JP | 2009108444 A | * | 5/2009 | | |

OTHER PUBLICATIONS

Huang (Materials 2009, 2, pp. 2370-2403) (Year: 2009).*

* cited by examiner

*Primary Examiner* — Robert A Vetere
(74) *Attorney, Agent, or Firm* — Thomas | Horstemeyer, LLP

(57) ABSTRACT

In accordance with the purpose(s) of the present disclosure, as embodied and broadly described herein, the disclosure, in one aspect, relates to carbon fibers with improved properties, methods of making the same, and compositions and articles comprising the same. This abstract is intended as a scanning tool for purposes of searching in the particular art and is not intended to be limiting of the present disclosure.

13 Claims, 2 Drawing Sheets

METHODS TO PRODUCE CARBON FIBERS FROM CARBON PITCHES

CROSS-REFERENCE TO RELATED APPLICATIONS

This Application claims the benefit of U.S. Provisional Application No. 62/946,643, filed on Dec. 11, 2019, which is incorporated herein by reference in its entirety.

BACKGROUND

Pitches suitable for producing carbon fibers currently require a specific crude oil feedstock. This crude oil is in high demand due to its limited supply and presents increased costs for producing carbon fibers. Pitches suitable for producing carbon fiber have also been generated from coal tar distillate resulting from the coking of high rank coals. However, yields are low and the economics of this method are also not favorable. Pitch suitable for generating carbon fibers has not previously been synthesized from low rank coals such as bituminous, sub-bituminous and lignite.

The calcination and graphitization of carbon fibers, post-extrusion, is a lengthy and difficult process, which greatly increases production costs. One of the major setbacks for the manufacture of carbon fibers is surface calcination needed as a first step for graphitization. If the extruded carbon fiber is simply heated it will melt back to a liquid. That is prevented by a surface oxidation and calcination before graphitization, which is very time and energy intensive. Additionally, current fiber pitches and post extrusion methods create voids in the carbon fibers, which negatively affect the end characteristics such as strength and conductivity.

Despite advances in the production of carbon fibers, the starting materials are still expensive and processing is time-consuming. Furthermore, current methods produce carbon fibers having voids and other undesirable structural characteristics that negatively affect their final properties. Disclosed herein are processes and starting materials for producing carbon fibers at lower cost and having improved performance characteristics.

SUMMARY

In accordance with the purpose(s) of the present disclosure, as embodied and broadly described herein, the disclosure, in one aspect, relates to carbon fibers with improved properties, methods of making the same, and compositions and articles comprising the same.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
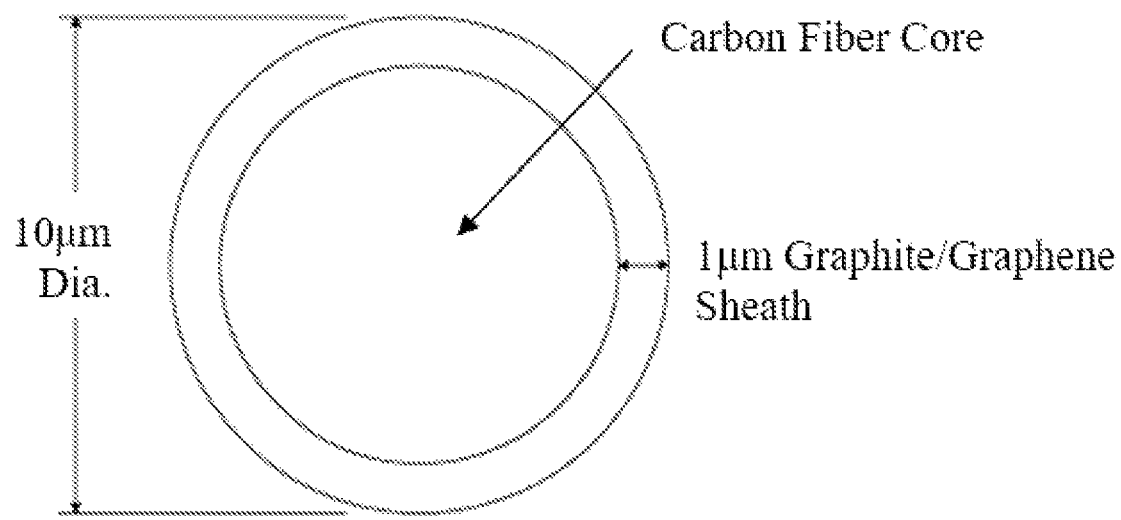
FIG. 1 shows a schematic of an example graphite or graphene sheath on a carbon fiber core as disclosed herein. In some aspects, the sheath has a thickness of approximately 1-2 µm, while the overall fiber, including the sheath, has a diameter of about 10 µm.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of".

As used in the specification and the appended claims, the singular forms "a," "an" and "the" include plural referents unless the context clearly dictates otherwise. Thus, for example, reference to "a carbon fiber" or "a volatile compound" includes, but is not limited to, mixtures of two or more such carbon fibers or volatile compounds, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a graphite/graphene material refers to an amount that is sufficient to achieve the desired improvement in the property modulated by the formulation component, e.g. achieving the desired level of mechanical strength and/or electrical conductivity. The specific level in terms of wt % in a composition required as an effective amount will depend upon a variety of factors including the desired diameter of the carbon fiber to be coated, the desired thickness of the coating, the extrusion temperature, and the end use of any articles made using the disclosed carbon fibers.

As used herein, the terms "optional" or "optionally" means that the subsequently described event or circumstance can or cannot occur, and that the description includes instances where said event or circumstance occurs and instances where it does not.

"Carbon fibers" refers to fibers between about 5 and 10 μm in diameter that are composed primarily of carbon atoms. Carbon fibers tend to have high temperature tolerance and low thermal expansion, high chemical resistance and tensile strength, and low weight. In one aspect, carbon fibers have a variety of applications in industry including in military and aerospace applications, motor sports, personal protective equipment including gloves and fabrics, bicycle frames, microelectrodes, and heating apparatuses. Traditionally, carbon fibers have been expensive to produce. In one aspect, the processes disclosed herein are useful for producing carbon fibers at a lower cost.

"Pitch" as used herein is a complex mixture of high boiling point organic molecules that is normally a solid at room temperature but that becomes a viscoelastic, non-Newtonian fluid when heated. Pitch is derived, as used herein, from coal. A "low softening point pitch" as used herein refers to a pitch that has a softening point, when heated, of from about 250° C. to about 350° C., or of about 300° C.

As used herein, "Reynolds number" refers to the ratio of inertial and viscous forces in a fluid. In one aspect, the pitches disclosed herein have high Reynolds numbers. In a further aspect, since the pitch has a high Reynolds number, graphite/graphene mixed with the pitch is forced to the surface of the pitch as it is extruded, forming a sheath around the resulting carbon fibers.

As used herein, "graphene" refers to a single layer of carbon atoms in a two-dimensional hexagonal lattice. In one aspect, graphene is the basic structural element of "graphite," which is a crystalline form of carbon with its atoms arranged in a hexagonal structure. Graphite is useful as a conductor of heat and electricity. In one aspect, providing a sheath of graphene or graphite on the carbon fibers disclosed herein can impart structural stability, thermal stability, and other improved mechanical properties to the carbon fibers disclosed herein. "Graphite/graphene" is used herein to refer to particles that can be used to make the sheath on the carbon fibers disclosed herein and that may be composed of a single layer (i.e. graphene) or a crystalline structure (i.e. graphite), as well as to the sheath itself, once formed.

"Calcination" as used herein refers to a thermal treatment to bring about further chemical changes to the carbon fibers disclosed herein. In one aspect, calcination improves stability and/or mechanical strength of the carbon fibers. In another aspect, the calcination step can be conducted in a microwave or an induction heater.

As used herein, "bituminous coal" is a soft coal containing bitumen. Typically, bituminous coal contains greater than 5% volatile matter. In one aspect, bituminous coal is useful as a starting material for carbon fibers in the processes described herein.

As used herein, "sub-bituminous" coal has properties between those of lignite coal and those of bituminous coal. In one aspect, sub-bituminous coal is useful as a starting material for carbon fibers in the processes disclosed herein.

"Lignite" coal is sometimes referred to as brown coal and has a fixed carbon content of about 25%, a high moisture content, and an ash content ranging from 6-19%. Lignite coal typically has a high content of volatile matter. In one aspect, lignite coal is useful as a starting material for carbon fibers in the processes described herein.

As used herein, "anisotropic" refers to a material that has properties that are directionally dependent (i.e., have different properties in different directions). In one aspect, the pitches disclosed herein are anisotropic. In some aspects, the carbon fibers produced by the processes disclosed herein are also anisotropic.

"Mesophase" as used herein refers to a state of matter intermediate between liquid and solid. In one aspect, the pitches disclosed herein are mesophase materials.

"Volatiles" as used herein refer to components of coal or pitch, other than moisture, that are released at high temperature or using air flow. In one aspect, volatiles can be short- or long-chain hydrocarbons, aromatic hydrocarbons, sulfur, and the like. In one aspect, volatiles are removed from the pitch disclosed herein by bubbling air through the pitch.

"Microwave" radiation may be useful in the processes disclosed herein. Microwave radiation is electromagnetic radiation with a wavelength of about 1 m to 1 mm and a frequency between 300 MHz and 300 GHz. In one aspect, the microwave radiation can be from a household microwave oven, an industrial microwave chamber, or another apparatus. In some aspects, microwave radiation is useful for final calcination of the carbon fibers disclosed herein.

"Induction heating" or "inductive heating" as used herein refers to heating an electrically conductive object using electromagnetic induction. In one aspect, an induction heater passes an alternating current through an electromagnet, which causes an alternating magnetic field to penetrate the object, generating eddy currents. In a further aspect, the eddy currents heat the object. In one aspect, inductive heating is useful herein for final calcination of the carbon fibers disclosed herein.

Unless otherwise specified, temperatures referred to herein are based on atmospheric pressure (i.e. one atmosphere).

Process for Preparing Carbon Fibers

In one aspect, disclosed herein is a process for preparing carbon fibers, the process including at least the following steps:
a. converting coal to a low-softening point pitch;
b. extruding the pitch into carbon fibers;
c. adding a graphite/graphene sheath to the carbon fibers; and
d. calcining the carbon fibers.

In one aspect, steps (b) and (c) of the process can be performed in any order; that is, the pitch can be extruded into carbon fibers before or after the graphite/graphene is added.

Coal, Pitch, and Oxygen Content

In one aspect, the coal useful herein can be selected from bituminous, sub-bituminous, lignite, and combinations thereof.

In another aspect, the pitch is an anisotropic mesophase carbon pitch. In still another aspect, the pitch has a high oxygen content. In one aspect, a high oxygen content in the pitch can be achieved by any technique known in the art. In one aspect, an air oxidation process can be used to increase the oxygen content of the pitch. In some aspects, air oxidation can involve bubbling fresh air into the pitch. In one aspect, fresh air is bubbled into the pitch at a flow rate of about 2 L/min. In still another aspect, bubbling fresh air into the pitch also serves to remove volatile compounds from the pitch.

In one aspect, the pitch has a softening point from about 250° C. to about 350° C., or of about 250, 255, 260, 265, 270, 275, 280, 285, 290, 295, 300, 305, 310, 315, 320, 325, 330, 335, 340, 345, or about 350° C., or a combination of any of the foregoing values, or a range encompassing any of the foregoing values. In one aspect, the pitch has a softening point of about 300° C.

In some aspects, prior to extrusion into carbon fibers, the low-softening point carbon pitch can be blended with a petroleum-derived pitch.

Extrusion of Carbon Fibers

In any of the above aspects, prior to and/or during extrusion, the pitch can be heated to a first temperature. In one aspect, the first temperature is from about 150° C. to about 345° C., or is about 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, or about 345° C., or a combination of any of the foregoing values, or a range encompassing any of the foregoing values. In one aspect, the first temperature is about 325° C.

In another aspect, the pitch is extruded through an orifice having a diameter of from about 5 to about 20 μm, or of about 5, 6, 7, 8, 9, 10, 11, 12, 13, 14, 15, 16, 17, 18, 19, or about 20 μm, or a combination of any of the foregoing values, or a range encompassing any of the foregoing values. In one aspect, the pitch is extruded using pressure such as, for example, head pressure of the vat holding the pitch or a pressurized manifold. In another aspect, the pitch is extruded by drawing the carbon fibers using a feed reel. In any of these aspects, the pitch can be extruded at a rate of about 7 m/min.

Characteristics of Carbon Fibers

In one aspect, the carbon fibers disclosed herein have a diameter of from about 5 to about 20 μm, or of about 5, 6, 7, 8, 9, 10, 11, 12, 13, 14, 15, 16, 17, 18, 19, or about 20 μm, or a combination of any of the foregoing values, or a range encompassing any of the foregoing values. In one aspect, the carbon fibers have a diameter of about 10 μm.

In another aspect, the carbon fibers have a cross-sectional area that is roughly circular in shape. Further in this aspect, the cross-sectional area can be approximated using the formula for area of a circle (e.g., area=×π(radius)$^2$ or area=π×(diameter/2)$^2$). In another aspect, the graphite/graphene forms a layer or sheath on the outside of the carbon fibers with a thickness of from about 1 to about 2 μm. In still another aspect, in order to achieve the desired sheath or outer graphite/graphene layer thickness, graphite/graphene is added to the pitch in a ratio equal to the thickness of the graphite/graphene layer to the desired cross-sectional area.

In one aspect, graphite/graphene is added to the pitch by mixing with the pitch prior to extrusion. Further in this aspect, since the pitch has a high Reynolds number, the graphite/graphene particles are forced to the surface of the fiber. In another aspect, the graphite/graphene is added to the carbon fibers by drawing the fibers through a bed of graphite/graphene. In still another aspect, graphite/graphene is added to the carbon fibers by electrostatic spray deposition.

Calcination of Carbon Fibers

In one aspect, following extrusion, the carbon fibers disclosed herein can be calcined by any method known in the art. In a further aspect, the carbon fibers can be calcined using microwave radiation. Further in this aspect, the microwave radiation has a frequency of about 2.45 GHz. In another aspect, the microwave radiation has a power level of about 1100 W. In still another aspect, the microwave radiation can be applied for an exposure time of from about 30 seconds to about 2 minutes, or for about 30 seconds, 45 seconds, 1 minute, 1 minute 15 seconds, 1 minute 30 seconds, 1 minute 45 seconds, or about 2 minutes, or a combination of any of the foregoing values, or a range encompassing any of the foregoing values. In one aspect, microwave radiation is applied for an exposure time of about 1 minute.

In an alternative aspect, the carbon fibers disclosed herein can be calcined using an inductive field. In one aspect, the inductive field has a frequency of from about 30 to about 80 kHz. In still another aspect, the inductive field has a maximum oscillating power of about 15 kW.

Also provided herein are carbon fibers produced by the method disclosed herein and articles containing the carbon fibers disclosed herein.

Advantages of the Disclosed Processes

In one aspect, the disclosed process represents a non-combustion use of low-ranking coals. Further in this aspect, the process presents fewer environmental hazards compared to combustion uses of raw materials that are otherwise of low economic and commercial value.

In another aspect, the process disclosed herein is efficient and greatly reduces the residence time for curing and graphitization of carbon fibers. In still another aspect, the carbon fibers disclosed herein have improved properties including, but not limited to, anisotropic thermal conductivity, high carbon content, reduced voids, and improved mechanical properties.

Aspects

The following listing of exemplary aspects supports and is supported by the disclosure provided herein.

Aspect 1. A process for preparing carbon fibers, the process comprising: (a) converting coal to a low-softening point carbon pitch; (b) extruding the pitch into carbon fibers; (c) adding a graphite/graphene sheath to the carbon fibers; and (d) calcining the carbon fibers.

Aspect 2. The process of Aspect 1, wherein the coal is selected from bituminous, sub-bituminous, lignite, and combinations thereof.

Aspect 3. The process of Aspect 1 or Aspect 2, wherein the pitch is an anisotropic mesophase carbon pitch.

Aspect 4. The process of any of Aspect 1-Aspect 3, wherein the pitch has a high oxygen content.

Aspect 5. The process of Aspect 4, wherein the high oxygen content of the pitch is achieved via an air oxidation process, the air oxidation process comprising bubbling fresh air into the pitch.

Aspect 6. The process of Aspect 5, wherein fresh air is bubbled into the pitch at a flow rate of 2 L/min.

Aspect 7. The process of Aspect 5 or Aspect 6, wherein bubbling fresh air into the pitch removes volatile compounds from the pitch.

Aspect 8. The process of any of Aspect 1-Aspect 7, wherein the pitch has a softening point of from about 250° C. to about 350° C.

Aspect 9. The process of any of Aspect 1-Aspect 7, wherein the pitch has a softening point of about 300° C.

Aspect 10. The process of any of Aspect 1-Aspect 9, further comprising between (a) and (b) step (a2): blending the low-softening point carbon pitch with a petroleum derived pitch.

Aspect 11. The process of any of Aspect 1-10, wherein the pitch is heated to a first temperature for extrusion.

Aspect 12. The process of Aspect 11, wherein the first temperature is from about 150° C. to about 345° C.

Aspect 13. The process of Aspect 11, wherein the first temperature is about 325° C.

Aspect 14. The process of any of Aspect 1-Aspect 13, wherein the pitch is extruded through an orifice having a diameter of from about 5 to about 20 μm.

Aspect 15. The process of any of Aspect 1-Aspect 14, wherein the pitch is extruded via pressure.

Aspect 16. The process of any of Aspect 1-Aspect 14, wherein the pitch is extruded via drawing the carbon fibers via a feed reel.

Aspect 17. The process of any of Aspect 1-Aspect 16, wherein the pitch is extruded at about 7 m/min.

Aspect 18. The process of any of Aspect 1-Aspect 17, wherein the carbon fibers comprise a diameter of from about 5 to about 20 μm.

Aspect 19. The process of Aspect 18, wherein the carbon fibers comprise a diameter of about 10 μm.

Aspect 20. The process of Aspect 18 or Aspect 19, wherein the carbon fibers comprise a cross-sectional area defined by $\pi \times (diameter/2)2$.

Aspect 21. The process of Aspect 20, wherein the graphite/graphene forms a layer on the outside of the carbon fibers comprising a thickness of from about 1 to about 2 μm.

Aspect 22. The process of Aspect 21, wherein graphite/graphene is added to the pitch or carbon fibers in a ratio of the thickness of the graphite/graphene layer to the cross-sectional area.

Aspect 23. The process of any of Aspect 1-Aspect 22, wherein graphite/graphene is added to the pitch by mixing with the pitch.

Aspect 24. The process of any of Aspect 1-Aspect 22, wherein graphite/graphene is added to the carbon fibers by drawing the fibers through a bed of graphite/graphene.

Aspect 25. The process of any of Aspect 1-Aspect 22, wherein graphite/graphene is added to the carbon fibers by electrostatic spray deposition.

Aspect 26. The process of any of Aspect 1-Aspect 25, wherein the carbon fibers are calcined using microwave radiation.

Aspect 27. The process of Aspect 26, wherein the microwave radiation has a frequency of about 2.45 GHz and a power level of about 1100 W.

Aspect 28. The process of Aspect 26 or Aspect 27, wherein the microwave radiation is applied for an exposure time of from about 30 seconds to about 2 minutes.

Aspect 29. The process of Aspect 26 or Aspect 27, wherein the microwave radiation is applied for an exposure time of about 1 minute.

Aspect 30. The process of any of Aspect 1-Aspect 25, wherein the carbon fibers are calcined using an inductive field.

Aspect 31. The process of Aspect 30, wherein the inductive field has a frequency of from about 30 to about 80 kHz and a maximum oscillating power of about 15 kW.

Aspect 32. Carbon fibers produced by the process of any of Aspect 1-Aspect 31.

Aspect 33. An article comprising the carbon fibers of Aspect 32.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Pitch Starting Material

Initially, a pitch suitable for the production of carbon fibers is produced through a coal conversion reaction and additional processing methods as needed to provide the required characteristics for carbon fiber production. An ideal pitch contains an appreciable level of oxygen, which aids in the cross-linking of the molecules and which is achieved by air oxidation. Fresh air is pumped into the pitch and allowed to bubble out. In some experiments, this was carried out at an air flow rate of about 2 L/min until a softening point of 300° C. is achieved. This process also strips the pitch of volatiles improves the overall structural integrity of the fibers by reducing the void spaces that are created during the extrusion, calcination, and graphitization processes.

Pitch Blending (Optional)

The coal-derived pitches described herein can also be blended with existing petroleum-derived pitch for producing carbon fibers. These pitches can be blended at any point after the coal conversion reaction. Furthermore, pitches that may not be suitable for carbon fiber production can be blended and subjected to the same ash removal and pitch upgrading and enhancement processes described herein to produce a blended pitch suitable for carbon fiber production.

Example 2

Fiber Extrusion

Once a suitable pitch has been prepared, it can be extruded into strands of carbon fiber. To extrude the carbon fibers, the fiber pitch is heated to a temperature between 150° C. and 345° C. At these temperatures, the pitch is fluid and able to be extruded. In a typical experiment, the pitch in heated until the desired level of fluidity is achieved. In some experiments, this temperature is about 325° C.

Following heating, the pitch is then extruded through an orifice with a diameter of between about 5 and about 20 μm via pressure on the pitch (either by the head pressure of the vat containing the pitch or using a pressurized manifold) or by drawing a fiber via a feed reel. The extrusion rate, feed rate, or real uptake rate is determined as a function of the pitch temperature, viscosity, and fiber geometry. This rate is typically determined during a tuning process. In some experiments a rate of 7 m/min was used, although this could be significantly different based on process parameters. The pitch behaves as a non-Newtonian fluid at elevated temperatures and can be extruded using previously published procedures.

Example 3

Fiber Post Processing

Microwave Calcination and Graphitization with Graphite/Graphene Additives

After the carbon fibers have extruded, they are subjected to a step that cross-links the carbon using oxygen in order for the fibers to remain intact through the graphitization treatment. In traditional carbon fiber production, this is a lengthy, high-energy process where the fibers are introduced into an oxygen-rich environment at elevated temperatures where the oxygen diffuses into the fibers.

The graphite/graphene sheath disclosed herein was produced by blending graphite or graphene with the prepared anisotropic mesophase pitch, pre-extrusion. During extrusion, due to the high Reynolds number of the pitch, the graphite/graphene particles are forced to the surface of the fiber resulting in a pitch-based fiber enclosed in a fine graphite/graphene sheath. To achieve the desired sheath thickness, the graphene/graphite is added and mixed thoroughly to the pitch in a ratio or percentage equal to that of the desired thickness to fiber area ratio of the coated fiber. For example, a carbon fiber at 10 μm total diameter and a 1 μm desired sheath thickness (FIG. 1) would require a 1:1.77 graphene/graphite to pitch mixture ratio.

In some experiments, the graphite/graphene sheath was produced by using various coating methods such as pulling the fibers through a bed of graphene or finely ground graphite or by aerosol deposition methods, post-extrusion. The surface of the uncured fiber could then be coated with the graphene/graphite via adhesion of the graphene/graphite to the uncured pitch fiber. Additionally, electrostatic charges can be used to attract the graphene/graphite particles to the fiber. In some experiments, electrostatic spray deposition was used, where the graphene/graphite powder was charged, thereby attracting to the grounded fiber. In other experiments, two or more coating or sheath synthesis processes were combined.

Once coated with graphite/graphene, the fiber was then pulled through a microwave source (or, in some experiments, a wave guide tunnel) and the external surface of the fiber was selectively heated to calcination temperatures via the eddy current effect. This calcined the surface as a pretreatment for graphitization. The fiber was then further processed to graphitization. The radiant energy of the microwave penetrated the surface of the fibers and heated the fibers, via the eddy current effect, more uniformly to produce a more consistent end product, compared to traditional thermal methods.

Microwaves can be applied radially or axially based on the desired crystalline structure. In past experiments, a frequency of ~2.45 GHz and power level of 1100 W at an exposure time of 1 min were applied radially to cure the fibers. However, any wavelength/frequency on the microwave spectrum and various power levels and exposure times (typically from seconds to minutes) could be used successfully.

Inductive Field Calcination and Graphitization

Figure 2:
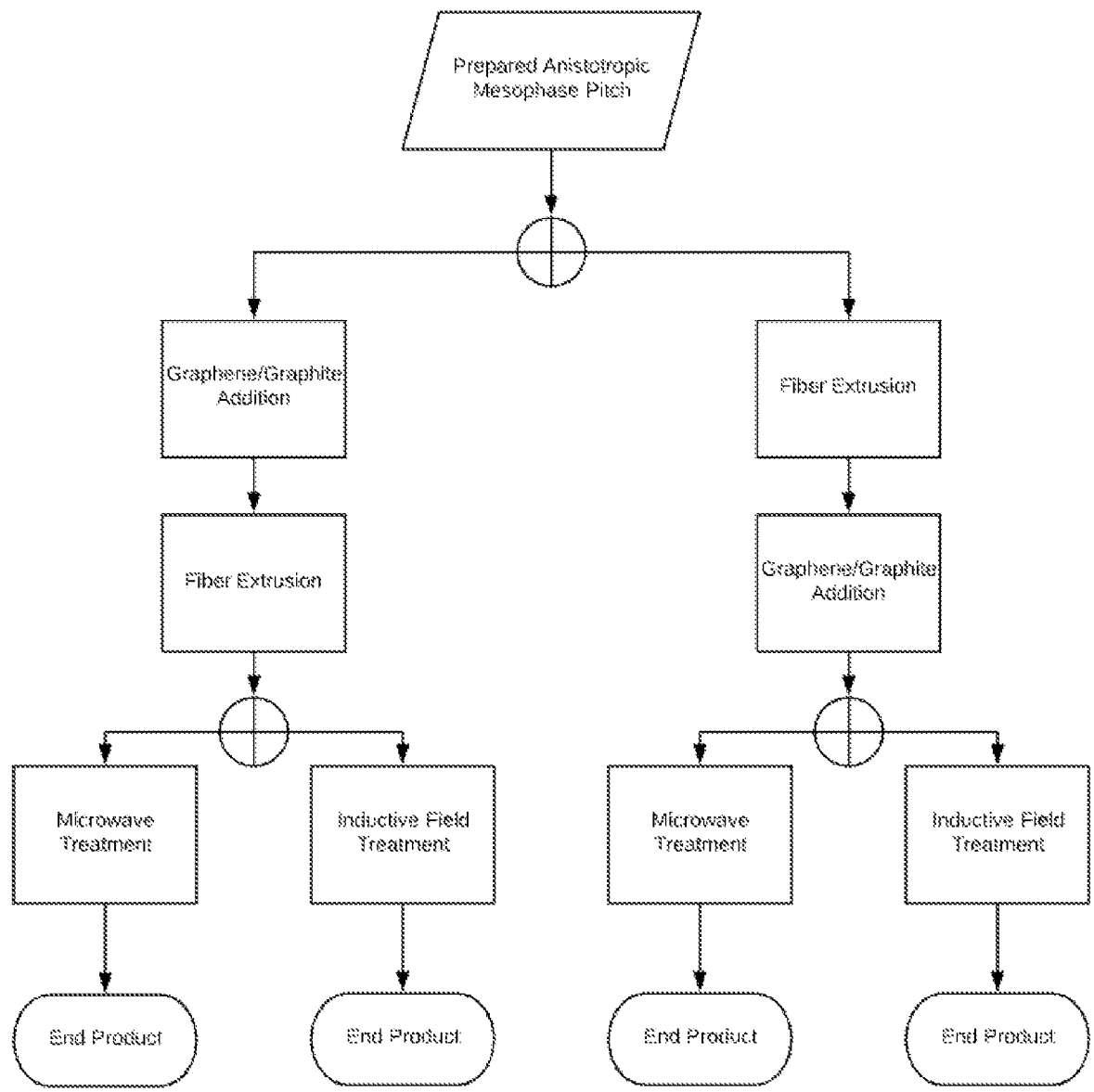
FIG. 2 shows a flow chart describing the processes disclosed herein. Starting from an anisotropic mesophase pitch as disclosed herein, graphite/graphene addition and fiber extrusion steps can be performed in any order. Following these steps, the fibers can be treated with a microwave or in an inductive field to produce a final product.

An alternative strategy to microwave calcination involved the method of drawing the fibers through an inductive field of increasing intensity in order to rapidly heat the fibers to graphitization temperatures. The inductive field graphitization method increased the efficiency of the calcination step by rapidly heating the carbon fibers to the desired temperatures. Depth of penetration was controlled through frequency modulation. In some experiments, a frequency of from 30 to 80 kHz was used, with a maximum oscillating power of 15 kW. Any wavelength/frequency on the radio wave spectrum and various power levels and exposure times (typically from seconds to minutes) could be used as needed. A flow chart of the processes disclosed herein can be seen in FIG. 2.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A process for preparing carbon fibers, the process comprising:
   (a) converting coal to a low-softening point carbon pitch;
   (b) extruding the pitch into carbon fibers;
   (c) adding a graphite/graphene sheath to the carbon fibers; and
   (d) calcining the carbon fibers;
   wherein the coal is selected from bituminous, sub-bituminous, lignite, and combinations thereof;
   wherein the pitch is an anisotropic mesophase carbon pitch;
   wherein the converting the coal to a low-softening point carbon pitch comprises air oxidation until a softening point from about 295° C. to about 350° C. is achieved, thereby yielding a low-softening point carbon pitch having a softening point from about 295° C. to about 350° C.;
   wherein the pitch is heated to a first temperature for extrusion;
   wherein the first temperature is from about 295° C. to about 345° C.;
   wherein the carbon fibers have a diameter from about 5 μm to about 10 μm;

wherein the graphite/graphene sheath comprises a layer on the outside of the carbon fibers having a thickness from about 1 μm to about 2 μm;

wherein the adding the graphite/graphene sheath to the carbon fibers comprises mixing graphite and/or graphene with the low-softening point carbon pitch prior to extrusion; and wherein the graphite and/or graphene is added to the low-softening point carbon pitch in a ratio equal to the thickness of the graphite/graphene layer to the desired cross-sectional area of the carbon fiber.

2. The process of claim 1, wherein the air oxidation process comprises bubbling ambient air into the pitch.

3. The process of claim 1, wherein the pitch has a softening point of about 300° C.

4. The process of claim 1, further comprising between (a) and (b) a step (a2), wherein step (a2) comprises blending the low-softening point carbon pitch with a petroleum derived pitch.

5. The process of claim 1, wherein the pitch is extruded at about 7 m/min.

6. The process of claim 1, wherein the carbon fibers have a diameter of about 10 μm.

7. The method of claim 1, wherein the carbon fibers are calcined using microwave radiation.

8. The method of claim 7, wherein the microwave radiation has a frequency of about 2.45 GHz and a power level of about 1100 W.

9. The method of claim 7, wherein the microwave radiation is applied for an exposure time of from about 30 seconds to about 2 minutes.

10. The method of claim 1, wherein the carbon fibers are calcined using an inductive field.

11. The method of claim 10, wherein the inductive field has a frequency of from about 30 to about 80 kHz and a maximum oscillating power of about 15 kW.

12. The method of claim 1, wherein the converting the coal to a low-softening point carbon pitch comprises air oxidation until a softening point of about 300° C.

13. The process of claim 1, wherein the first temperature is about 325°C.

* * * * *